United States Patent
Sugiyama

(10) Patent No.: US 8,406,576 B2
(45) Date of Patent: Mar. 26, 2013

(54) OPTICAL MODULATOR AND OPTICAL TRANSMITTER

(75) Inventor: Masaki Sugiyama, Kawasaki (JP)

(73) Assignee: Fujitsu Optical Components Limited, Kawasaki (JP)

(*) Notice: Subject to any disclaimer, the term of this patent is extended or adjusted under 35 U.S.C. 154(b) by 238 days.

(21) Appl. No.: 12/862,864

(22) Filed: Aug. 25, 2010

(65) Prior Publication Data

US 2011/0081107 A1 Apr. 7, 2011

(30) Foreign Application Priority Data

Oct. 7, 2009 (JP) ................................. 2009-233488

(51) Int. Cl.
*G02F 1/035* (2006.01)
(52) U.S. Cl. ............................................. 385/2; 385/8
(58) Field of Classification Search .................... 385/1–3
See application file for complete search history.

(56) References Cited

U.S. PATENT DOCUMENTS

| | | | |
|---|---|---|---|
| 5,991,491 A * | 11/1999 | Madabhushi | ................. 385/131 |
| 6,950,580 B2 * | 9/2005 | Mitomi et al. | ................. 385/40 |
| 2003/0147575 A1 | 8/2003 | Sugiyama et al. | |
| 2006/0056766 A1 * | 3/2006 | Sugiyama | ...................... 385/40 |
| 2007/0081766 A1 * | 4/2007 | Aoki et al. | ...................... 385/40 |

FOREIGN PATENT DOCUMENTS

| JP | 11-237593 | 8/1999 |
|---|---|---|
| JP | 2003-233048 | 8/2003 |

* cited by examiner

*Primary Examiner* — Hemang Sanghavi
(74) *Attorney, Agent, or Firm* — Staas & Halsey LLP

(57) ABSTRACT

An optical modulator including: a substrate which has electro-optic effect; a Mach-Zehnder optical interferometer which is formed in the substrate and which includes a first waveguide and a second waveguide; a signal electrode which applies an electrical field to the Mach-Zehnder optical interferometer through being supplied with an electric signal corresponding to a signal for optical modulation; a ground electrode formed apart from the signal electrode; and a conductor section which is narrow in a middle thereof along the light propagating direction and which gradually becomes wider towards the starting end and the terminating ends thereof along the light propagating direction in an interacting portion at which the electric field applied by the signal electrode interacts with light propagating through the first waveguide and the second waveguide.

14 Claims, 14 Drawing Sheets

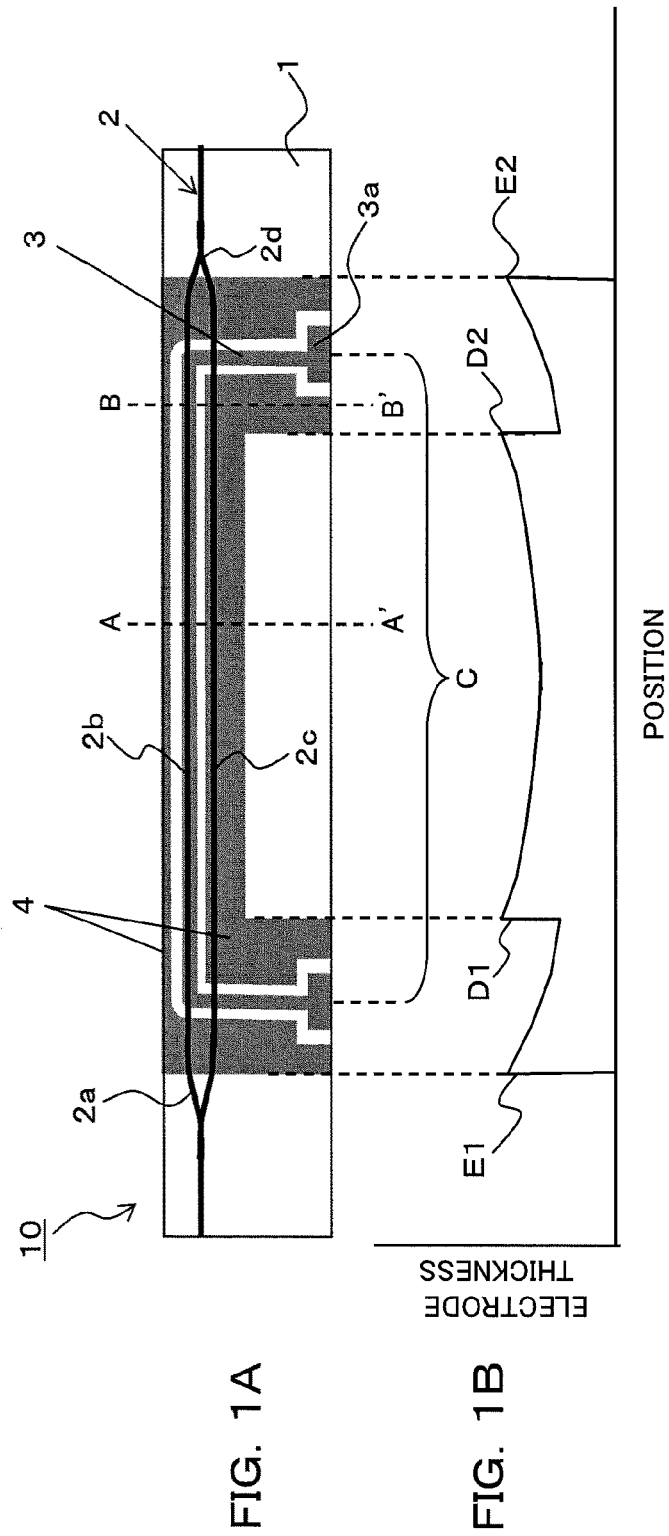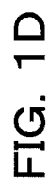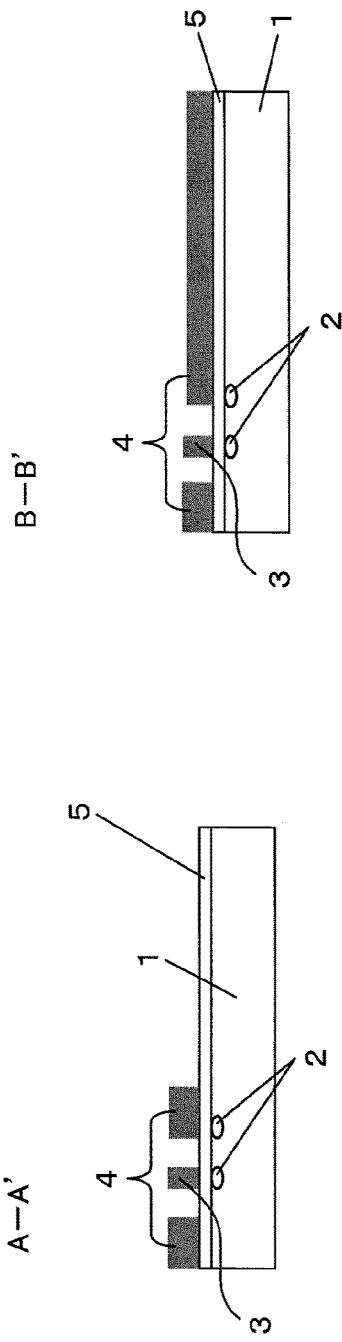

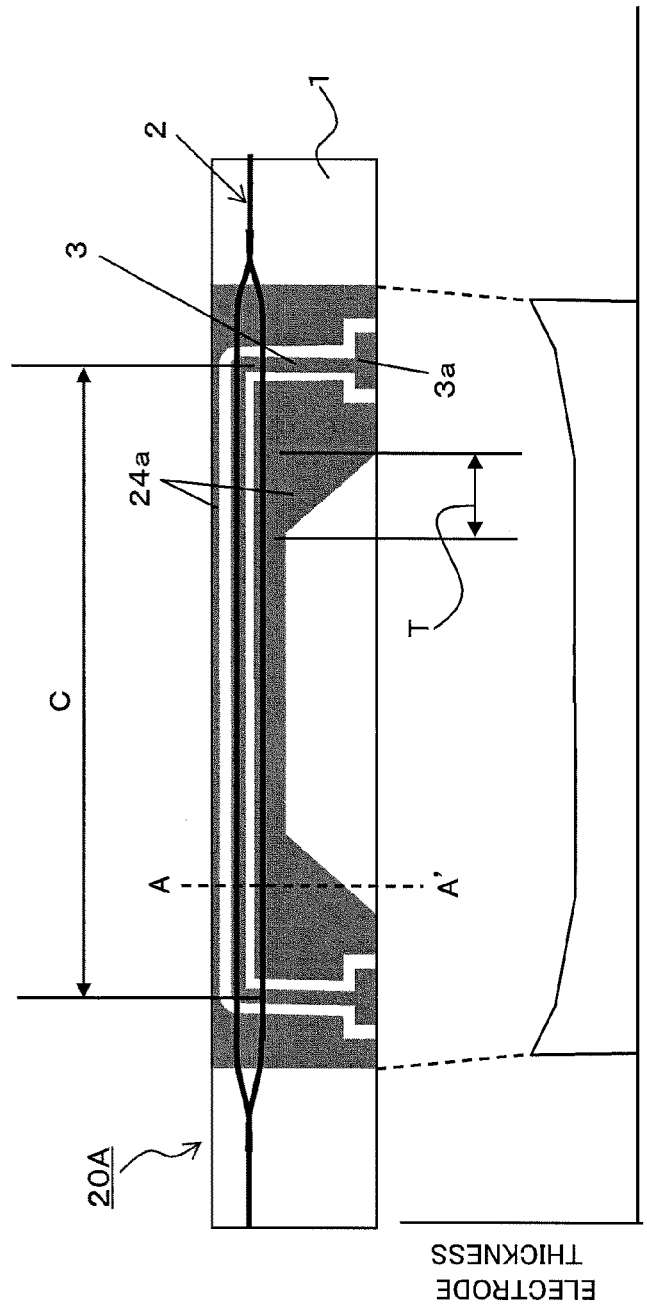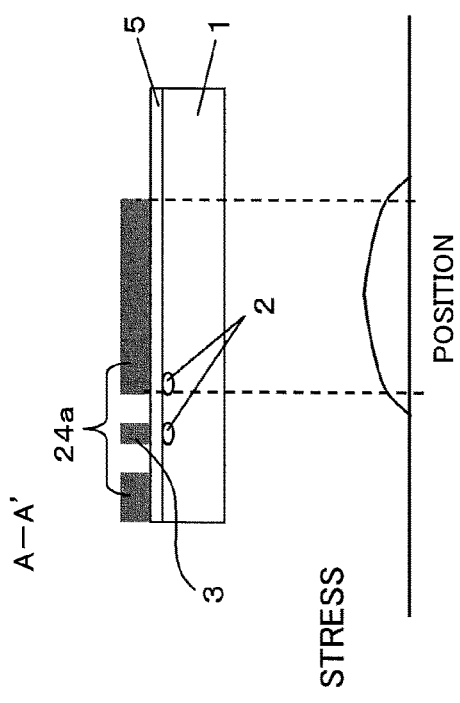
FIG. 2A
FIG. 2B
FIG. 2C
FIG. 2D

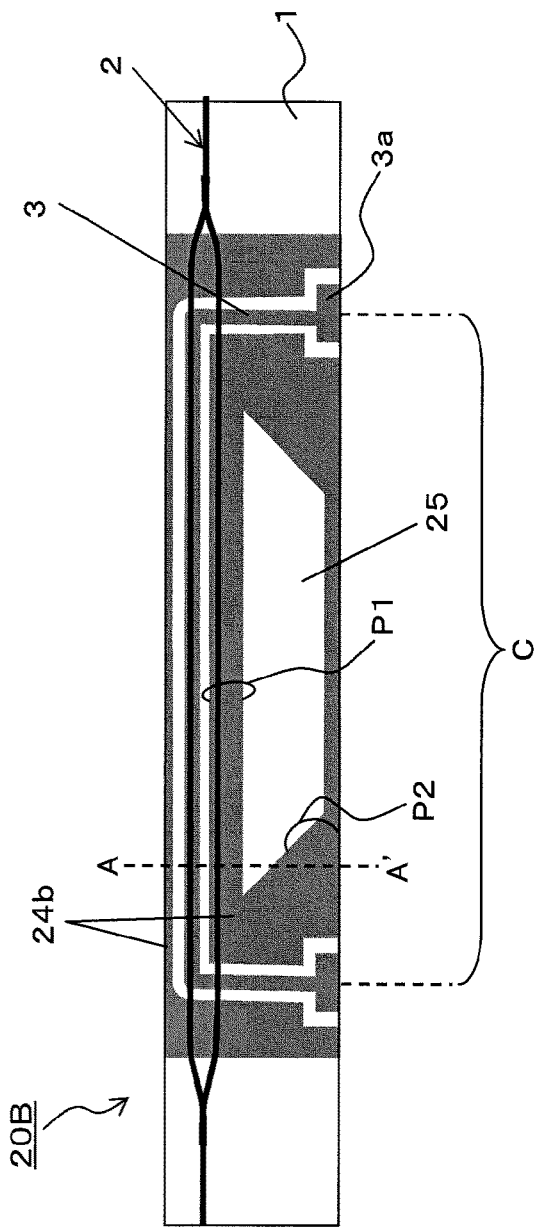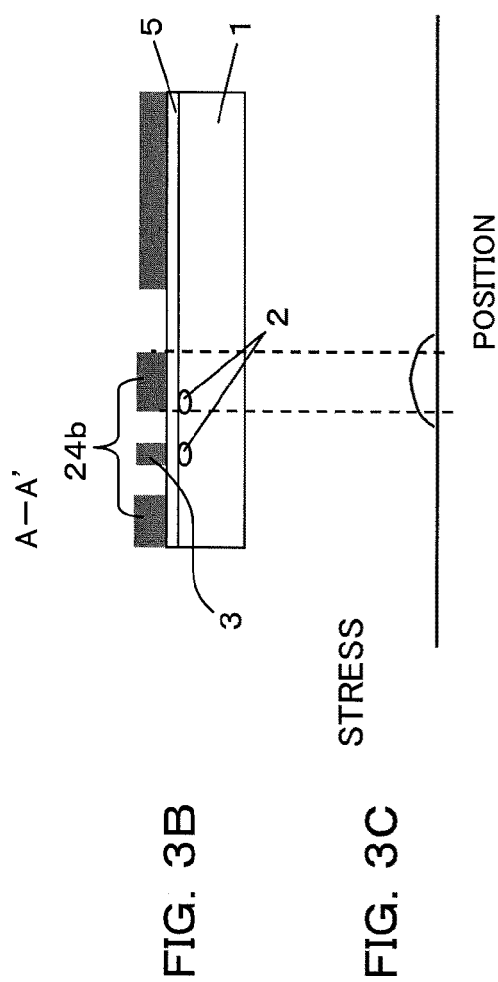
FIG. 3A
FIG. 3B
FIG. 3C

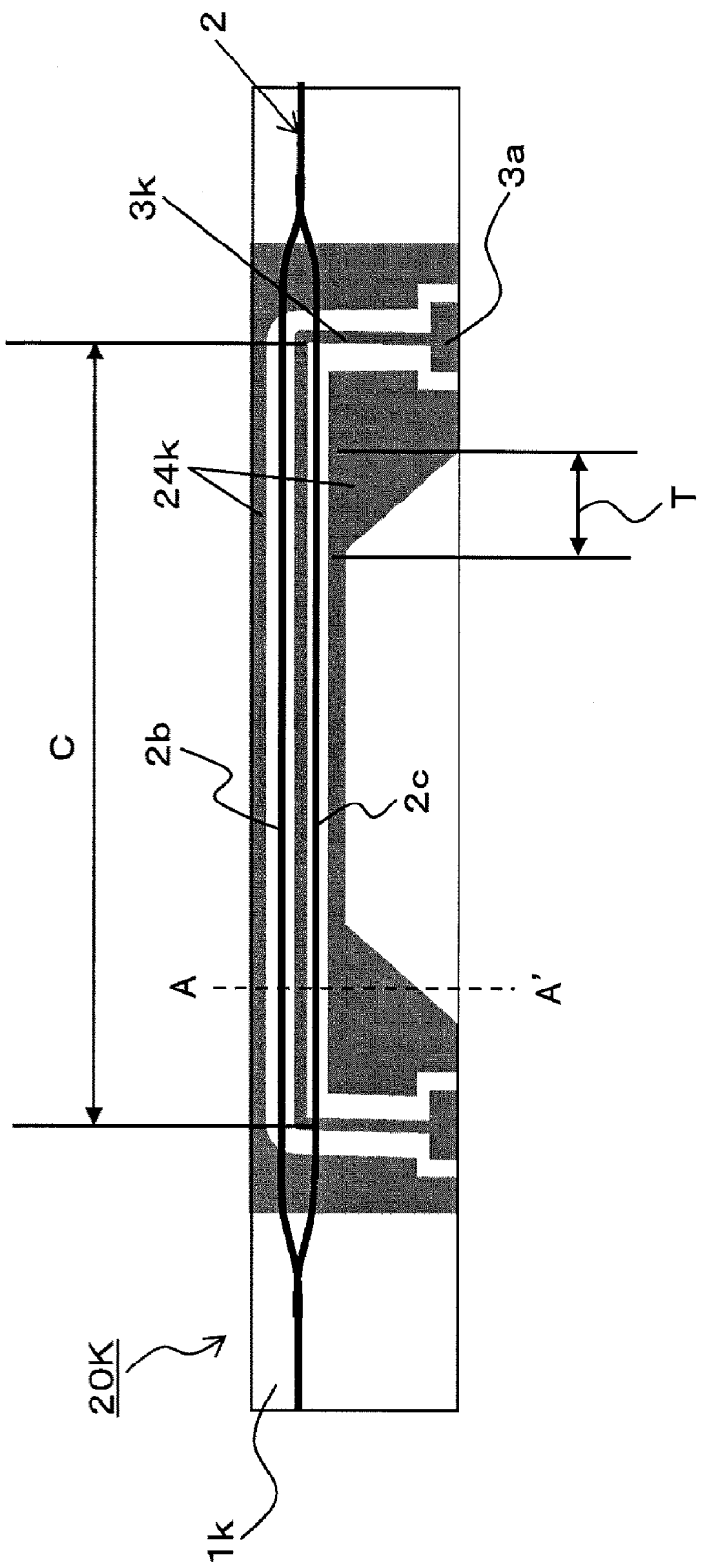

OPTICAL MODULATOR AND OPTICAL TRANSMITTER

CROSS-REFERENCE TO RELATED APPLICATION

This application is based upon and claims the benefit of priority of the prior Japanese Application No. 2009-233488 filed on Oct. 7, 2009 in Japan, the entire contents of which are hereby incorporated by reference.

FIELD

The embodiments discussed herein are related to an optical modulator and an optical transmitter.

BACKGROUND

An optical modulator is one of optical waveguide devices using electro-optic crystal, such as a substrate made of $LiNbO_3$ (LN) or $LiTaO_2$. An optical modulator can be fabricated by, for example, forming an optical waveguide on part of the crystalline substrate and then disposing electrodes in the vicinity of the optical waveguide. Here, the optical waveguide is formed through thermal diffusion of a metal layer such as Ti formed on part of the substrate or through proton exchange in benzoic acid after the patterning.

One of such optical modulators includes a Mach-Zehnder optical interferometer which is formed on a crystalline substrate and that has a pair of interfering arm waveguides, and additionally includes a signal electrode and ground electrodes in the vicinity of the interfering arm waveguides to serve as coplanar electrodes.

For example, input light is introduced into the Mach-Zehnder optical interferometer and an electric signal (voltage signal) is applied to an electrode to interact with each other. As a result of the interaction, the refractive index of the Mach-Zehnder optical interferometer is varied, so that a modulated optical signal is output.

To cope with surge in transmission capacity, an optical communication system has issues of, for example, improvement in high-frequency characteristics of an optical modulator; low energy consumption due to enhance electric-field application efficiency; and cost reduction of device materials.

In an optical modulator, a portion at which a signal electrode is disposed along the interfering arm waveguides is a portion (interacting portion) at which the interaction occurs. For example, with the intentions of improving the efficiency of application of an electric field to the waveguide and also reducing material costs for electrodes, there are proposed techniques each in which the ground electrodes are formed so as not to cover the entire width of the substrate in the interacting portion of an optical modulator so that the interacting portion has a portion not covered with an electrode (e.g., Patent Literatures 1 and 2).

[Patent Literature 1] Japanese Laid-open Patent Publication No. 11-237593

[Patent Literature 2] Japanese Laid-open Patent Publication No. 2003-233048

SUMMARY (1) According to an aspect of the embodiments, an apparatus includes an optical modulator including: a substrate which has electro-optic effect; a Mach-Zehnder optical interferometer which is formed in the substrate and which includes a first waveguide and a second wave guide; a signal electrode which applies an electrical field to the Mach-Zehnder optical interferometer through being supplied with an electric signal corresponding to a signal for optical modulation; a ground electrode formed apart from the signal electrode; and a conductor section which is narrow in a middle thereof along the light propagating direction and which gradually becomes wider as approaching both ends thereof along the light propagating direction in an interacting portion at which the electric field applied by the signal electrode interacts with light propagating through the first waveguide and the second waveguide.

(2) According to an aspect of the embodiments, an apparatus includes an optical transmitter including the optical modulator of the above item (1).

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 1A is a plane view of an optical modulator; FIG. 1B is a diagram illustrating a distribution of the thickness of an electrode in the longitudinal direction of the optical modulator; FIG. 1C is a sectional view of the line AA' of FIG. 1A; and FIG. 1D is a sectional view of the line BB' in FIG. 1A.

FIG. 2A is a plane view of an optical modulator; FIG. 2B is a diagram illustrating a distribution of the thickness in the longitudinal direction of the optical modulator; FIG. 2C is a sectional view of the line AA' of FIG. 2A; and FIG. 2D is a diagram illustrating a distribution of a stress in FIG. 2C.

FIG. 3A is a plane view of an optical modulator; FIG. 3B is a sectional view of the line AA' of FIG. 3A; and FIG. 3C is a diagram illustrating a distribution of a stress in FIG. 3B.

FIG. 12 is a plane view of an optical modulator.

DESCRIPTION OF EMBODIMENTS

Figure 4:
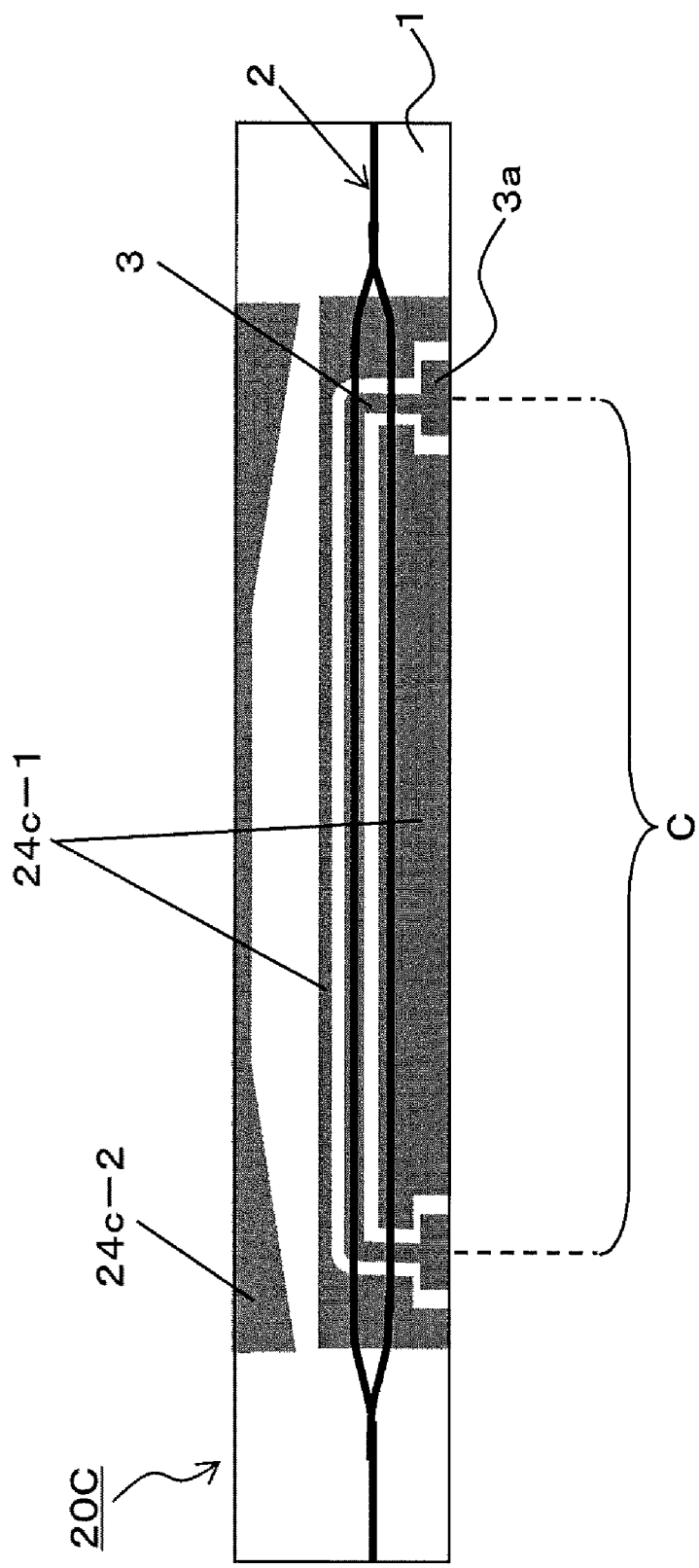
FIG. 4 is a plane view of an optical modulator.

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

FIG. 1 illustrates an example of an optical modulator 10. FIG. 1A is a plane view of the optical modulator 10; FIG. 1B is a diagram illustrating a distribution of the thickness of an electrode in the longitudinal direction of the optical modulator; FIG. 1C is a sectional view of the line AA' of FIG. 1A; and FIG. 1D is a sectional view of the line BB' in FIG. 1A.

The optical modulator 10 of this example includes a Z-cut substrate 1 having electro-optic effect and a Mach-Zehnder optical interferometer 2 formed on the substrate 1. The Mach-Zehnder optical interferometer 2 includes an input waveguide 2a that divides input light into two branches, interfering arm waveguides 2b and 2c each of which has one end coupled to one branch of the input waveguide 2a, and output waveguide 2d which is coupled to the other end of each of the interfering arm waveguides 2b and 2c.

The signal electrode 3 is formed over the interfering arm waveguide 2b and ground electrodes 4 are formed apart from the signal electrode 3, so that the coplanar electrode are formed. In the use of a Z-cut substrate as the substrate 1, the signal electrode 3 is formed over the interfering arm waveguide 2b (or 2c) as illustrated in the drawing with the intention that the variation in refractive index due to the Z-direction electric field is utilized. In the meantime, in the use of an X-cut substrate as the substrate 1, the signal electrode 3 is formed between the interfering arm waveguides 2b and 2c with the intention that the variation in refractive index due to the X-direction electric field.

For high-speed operation of the optical modulator, terminals of the signal electrode 3 and the ground electrodes 4 are coupled via a resistor to form travelling-wave electrodes and a micro-wave signal is applied from the input ends. Consequently, light modulated due to interaction between an electric field and light is output. Specifically, the electric field varies the refractive indexes of the two interfering arm waveguides 2b and 2c to $+\Delta na$ and $-\Delta nb$, respectively, so that the phase difference between the interfering arm waveguides 2b and 2c varies. The resultant Mach-Zehnder interference outputs a signal light having a modulated intensity from the output electrode 2d. Hereinafter, a portion C at which the electric field of the optical modulator 10 interacts with light on the substrate 1 is called an interacting region or an interacting portion.

In order to inhibit light propagating through the Mach-Zehnder optical interferometer 2 from being absorbed into the electrodes 3 and 4, the buffer layer 5 made of $SiO_2$ may be interposed between the substrate 1 and the electrodes 3 and 4 as illustrated in FIGS. 1C and 1D. The reference number 3a represents a pad formed to conduct an electrical signal for optical modulation from an external device or others. A signal line is coupled to a point of the pad 3a by bonding or other processing.

For example, the signal electrode 3 and the ground electrodes 4 can be formed through electrolytic plating. To ensure the characteristic impedances and the high-frequency characteristics, the electrodes 3 and 4 are formed to have thicknesses (heights) of some extent.

In plating, the speed of layer depositing depends on the widths and the positions in the pattern of the electrodes 3 and 4. Namely, in forming an electrode 4 having a wide portion and a narrow portion in the width direction perpendicular to the longitudinal direction, i.e., the light propagating direction of the Mach-Zehnder optical interferometer 2, the speed of depositing the layer at the wide portion differs from that at the narrow portion. Furthermore, the speed of depositing in the vicinity of edges of the pattern differs from that in the vicinity of the center of the pattern.

Specifically, narrow-width portions of the electrodes 3 and 4 have a relatively high plating speed and therefore tend to be thickly deposited. On the other hand, wide-width portions of the electrodes 3 and 4 have a relatively low plated speed and therefore tends to be thinly deposited.

In the optical modulator 10 having an electrode pattern exemplified by that of FIG. 1A, the combined form of the electrodes 3 and 4 is narrow in width in the middle portion of the interacting section C as illustrated in FIG. 1C while wide in width in the vicinity of the pads 3a as illustrated in FIG. 1D. The optical modulator 10 of FIG. 1A has a distributed thickness of the electrode as illustrated in FIG. 1B.

Concretely, in the optical modulator 10, the middle portion (between D1 and D2) of the interacting portion C is narrower in width than the end portions (between E1 and D1, and between D2 and E2) in the vicinity of the pads 3a positioned at both ends of the interacting portion C. The density of the combined form of the electrodes 3 and 4 at the middle portion is low, resulting in a tendency of a large thickness of the electrode as illustrated in FIG. 1B. In the meantime, the width of the ground electrodes 4 is relatively wide in the vicinity of the pads 3a, resulting in a high density of the combined form of the electrodes 3 and 4. The density of an electrode represents a ratio of the width of the electrode to that of the substrate 1.

A point at which the electrode density in the longitudinal direction of the substrate 1 sharply varies may have a step of the thickness of the electrode 4. For example, the width of the electrode 4 in the longitudinal direction stepwise and largely varies at points D1 and D2 in FIG. 1A. At these points, the thickness of the electrode also stepwise and largely varies as illustrated in FIG. 1B to have peaked steps or peaked undulations of the thickness of the electrodes 3 and 4. The points E1 and E2 of FIG. 1A corresponds to the boundary of the ground electrode 4. Also in the vicinities of points E1 and E2, the electrode density at electrode regions and that at non-electrode regions are largely and sharply different from each other, so that the shapes of the electrodes 3 and 4 of the thickness direction has sharp steps.

Variation in thickness of the electrodes 3 and 4 causes variation in speed of a microwave propagating through the electrodes and in the characteristic impedance of the microwave. For instance, a 20% increase in thickness of the electrode reduces the speed of the microwave and the characteristic impedance by 2% and 3%, respectively. The variation of the speed of the microwave narrows the modulation band and the variation of the characteristic impedance results in lower reflection characteristic of the microwave. In an example, the modulation band narrows from about 46 GHz to about 32 GHz and the variation of the characteristic impedance lowers reflection (S11) of the microwave by 6 dB.

In contrast, the optical modulator 20A illustrated in FIG. 2A includes a ground electrode 24a different in pattern from the ground electrodes 4 of FIG. 1A. The different pattern of the ground electrode 24a can inhibit the thickness of the electrode from varying. Specifically, in the interacting portion C, at which the electric field applied by the signal electrode 3 interacts with light propagating through the interfering arm waveguides 2b and 2c, the ground electrode 24a includes a conductor section having a pattern of being narrow along the light propagating direction in the middle of the interacting portion C and linearly and gradually becoming wider as approaching both ends. The symbol "T" represents a portion (tapered section) of the ground electrode which portion linearly and gradually becomes wider as approaching an end in the light propagating direction.

The signal electrode 3 is provided with an electric signal corresponding to a signal for optical modulation to thereby apply the electric field to the Mach-Zehnder optical interferometer 2. The ground electrodes 24*a* are disposed apart from the signal electrode 3. FIG. 2C is a sectional view of line AA' of FIG. 2A, and FIG. 2D is a stress distribution on the substrate corresponding to the section of the substrate in FIG. 2C.

In the optical modulator 20A illustrated in FIG. 2A, the ground electrode 24*a* from the interacting portion C is inhibited from having stepwise and large variation in width to the vicinities of the pads 3*a*. Thereby, points in FIG. 2A corresponding to the points D1 and D2 of FIG. 1A have stepless variation in electrode density. Accordingly, the resultant electrodes 3 and 24*a* in the optical modulator 20A has an even thickness as illustrated in FIG. 2B, so that the optical modulator 20 has no point at which the thickness largely varies.

The optical modulator 20A of FIG. 2A including the ground electrode 24*a* having an even thickness, which makes it possible to match the speed of the microwave propagating through the electrode and the characteristic impedance of the microwave. Furthermore, the modulation band can also be widened, improving the reflection characteristic of the microwave.

Similarly to the optical modulator 20A illustrated in FIG. 2A, portions of the optical modulator 20B illustrated I FIG. 3A corresponding to the points D1 and D2 of FIG. 1A have stepless variations of the electrode density so that occurrence of stepwise variation in thickness is inhibited. The optical modulator 20B is different in pattern of the ground electrode 24*b* from the optical modulator 20A.

One of ground electrode 24*b* includes a hollow 25 that is void of an electrode. In the interacting portion C, the hollow 25 is wide in the middle portion thereof along the light propagating direction in and gradually narrows as approaching both ends thereof along the light propagating direction. The ground electrode 24*b* with the hollow 25 includes a portion P1 which is interposed between the signal electrode 3 and the hollow 25 and which has a substantially uniform width along the light propagating direction and also includes a portion P2 which is on the opposite side of the hollow 25 to the portion P1 and which gradually becomes wider as approaching both ends of the portion P2.

The portion P2 is disposed on the opposite side to P1, which is adjacent to the signal electrode 3, of hollow 25 of the substrate and gradually becomes wider as approaching both ends of the portion P2 along the light propagating direction.

Also in the optical modulator 20B illustrated in FIG. 3A, the variation in electrode density of the ground electrode 24*b* is made stepless so that the ground electrode 24*b* has an even thickness. Consequently, the optical modulator 20B involves the same advantage as the optical modulator 20A illustrated in FIG. 2A.

The optical modulator 20A has a distribution of stress of FIG. 2D caused by the difference in coefficient of thermal expansion between the ground electrode 24*a* and substrate 1 while the optical modulator 20B can reduce the stress distribution through varying the electrode pattern. Specifically, since the ground electrode 24*b* includes the region (P2) at the side end of substrate 1, the region (P1) adjacent to the signal electrode 3, and the region (hollow 25) interposed between these regions, the loads of stress among electrodes and the substrate can be cancelled. Thereby, the optical modulator 20B have the less stress distribution than that of FIG. 2D, as illustrated in FIG. 3C.

Also in the optical modulator 20C of FIG. 4, portions corresponding to the points D1 and D2 of FIG. 1A have stepless variations of the electrode density so that occurrence of stepwise variation in thickness is inhibited, similarly to the optical modulator 20A in FIG. 2A. The optical modulator 20D includes ground electrodes 24*c*-1 and a floating electrode 24*c*-2 different in pattern from the optical modulators 20A and 20B. A floating electrode is an electrode that is not coupled to an electrode provided with electric potential, such as a ground electrode and a signal electrode.

Specifically, the ground electrodes 24*c*-1 serve as ground electrodes formed apart from the signal electrode 3 while the electrode 24*c*-2 serves as a floating electrode disposed on the side end opposite to the side end with the pad 3*a* on the substrate 1. The floating electrode 24*c*-2 possesses a floating electric potential different from the electric potential of the signal electrode 3 and the ground electrode 24*c*-1. The floating electrode 24*c*-2 is an example of a conductor section that is narrow in the middle portion along the light propagating direction and gradually becomes wider as approaching both ends thereof in the interacting portion C.

A combination form of the ground electrodes 24*c*-1 and the signal electrode 3 have a substantially even width, but does not cover the entire width of the substrate 1. The presence of the floating electrode 24*c*-2 makes portions corresponding to the points D1 and D2 of FIG. 1A possible to have stepless variations of the electrode density so that occurrence of stepwise variation in thickness is inhibited.

The substrate 1 has an exposed portion not covered with an electrode layer between the side portion covered with the floating electrode 24*c*-2 and a portion covered with the ground electrode 24*c*-1. The presence of the exposed portion can further reduce the distribution of stress as compared with the case of FIG. 2D the same as the optical modulator of FIG. 3A. Consequently, non-linear effect (photoelastic effect) can be inhibited.

Figure 5:
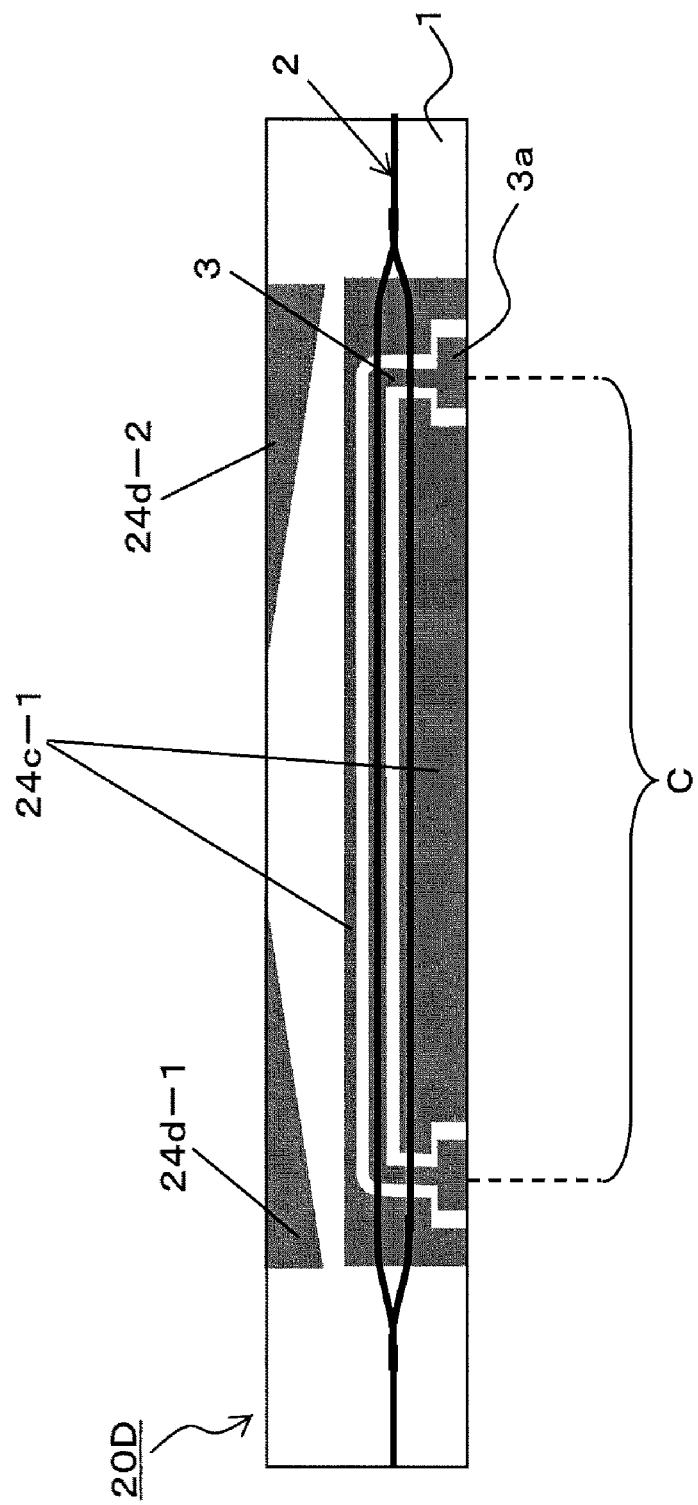
FIG. 5 is a plane view of an optical modulator.

The optical modulator 20D of FIG. 5 includes floating electrodes 24*d*-1 and 24*d*-2 different in pattern from the floating electrode 24*c*-2 of FIG. 4. Omitting the middle portion of the floating electrode 24*c*-2 of FIG. 4 forms the floating electrodes 24*d*-1 and 24*d*-2, which serve as an example of the conductor section in combination of each other. This configuration of the optical modulator 20D ensures the same advantages as those of the optical modulator 20C of FIG. 4.

The electric potentials of the floating electrodes 24*c*-2, 24*d*-1, and 24*d*-2 may be set to be the same as those of the ground electrodes 24*c*-1, which can stabilize the operating point of optical modulation.

Figure 6:
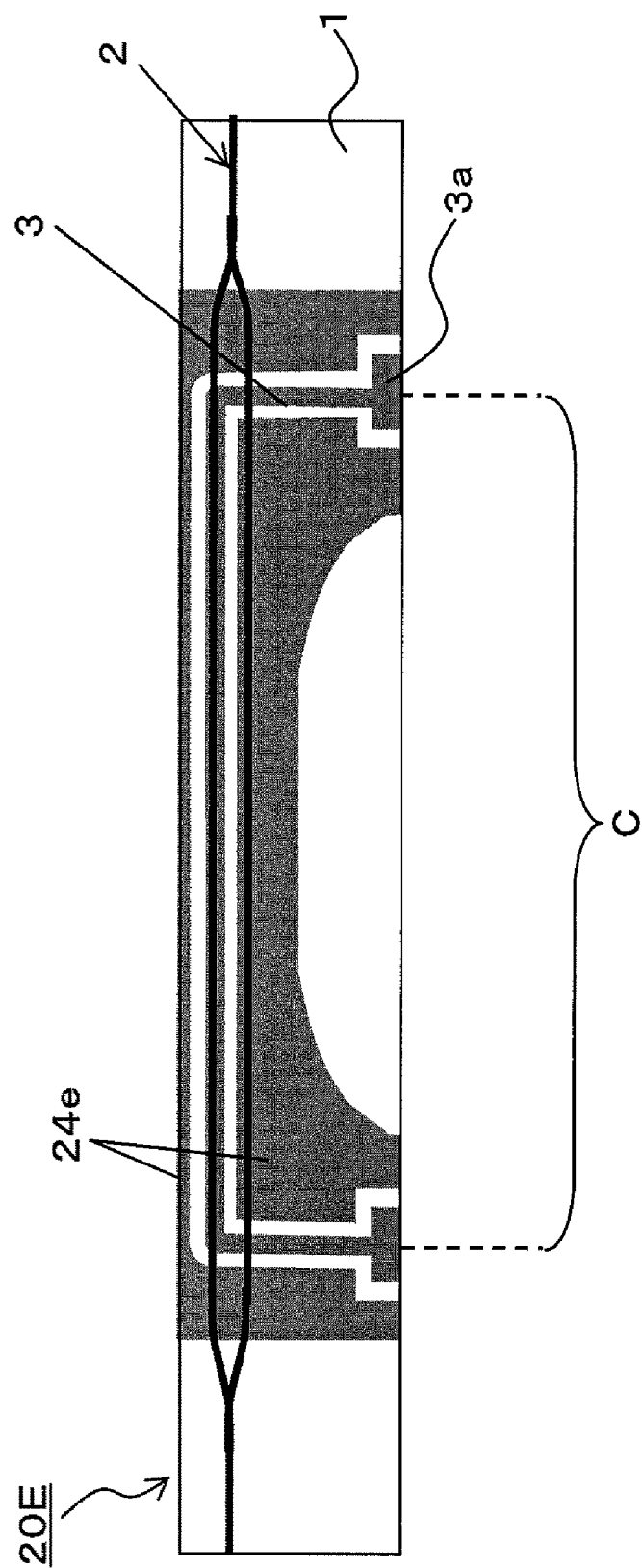
FIG. 6 is a plane view of an optical modulator.

The optical modulator 20E illustrated in FIG. 6 includes a ground electrode 24*e* different in pattern from that included in the optical modulator 20A of FIG. 2. Specifically, the ground electrode 24*e* has a pattern, at the interacting portion C where the electric field applied by the signal electrode 3 interacts with the light propagating though the interfering arm waveguides 2*b* and 2*c*, that is narrow in the middle along the light propagating direction and gradually and curvedly becomes wider as approaching both ends of the pattern. This configuration of the optical modulator 20E ensures the same advantages as those of the optical modulator 20A of FIG. 2A.

The speed of layer depositing of the electrodes is low at portion in the vicinity of the pads 3*a* and becomes higher as approaching the center in the light propagation direction of the interacting portion C. For the above, the optical modulator 20E of FIG. 6 has a curved shape modified on the basis of the speed of layer depositing, so that the thickness of the electrodes can be further even.

Figure 7A:
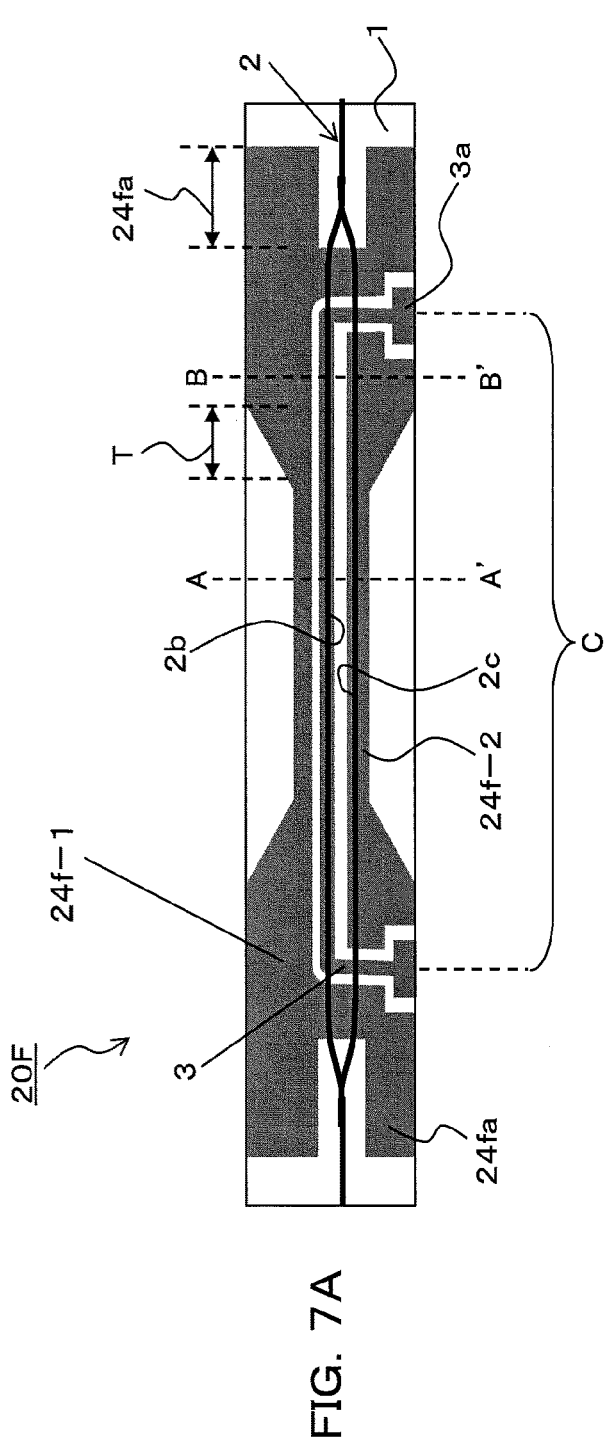
FIG. 7A is a plane view of an optical modulator.

Differently from the optical modulators 20A through 20E, an optical modulator 20F illustrated in FIG. 7A arranges the Mach-Zehnder optical interferometer 2 along the longitudinal direction at the point near to the width-direction center of the substrate 1. Otherwise, the interfering arm waveguides 2b and 2 are arranged approximately symmetric with respect to the center axis of the chip serving as the substrate 1. This arrangement makes it possible to inhibit the operating point of optical modulation from deviating even when the circumferential temperature varies.

Also in this case, the patterns of ground electrodes 24f-1 and 24f-2 of the optical modulator 20F are different from those included in the above optical modulators 20A through 20E. Specifically, the ground electrodes 24f-1 and 24f-2 disposed on both side of the signal electrode 3 are each narrow in the middle along the light propagating direction, and gradually and linearly become wider as approaching both ends in the interacting portion C. This configuration makes the optical modulator 20F possible to have the same advantages as those of the optical modulator 20A illustrated in FIG. 2A.

The ground electrodes 24f-1 and 24f-2 each include extending portions 24fa extending outside the interacting portion C (for example, both ends in the light propagating direction) along the light propagating direction over a portion under which the Mach-Zehnder optical interferometer 2 is not formed. This configuration reduces a degree of variation in electrode density at portions corresponding to portions E1 and E2 of FIG. 2 so that the thickness of the electrode at the interacting portion C can be further even. Since the extending portions 24fa are formed over a portion except for a portion over the optical interferometer 2, absorbing light propagating through the optical interferometer 2 into the electrodes can be inhibited.

Figure 7C:
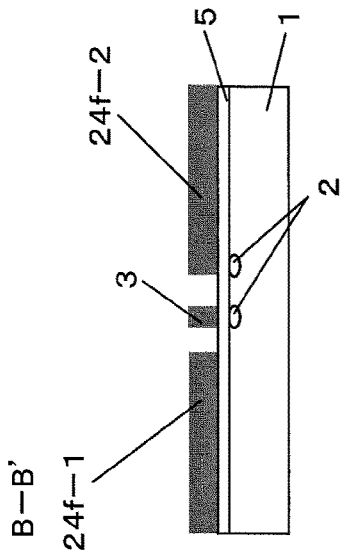
FIG. 7C is a sectional view of the line BB' of FIG. 7A.
Figure 7B:
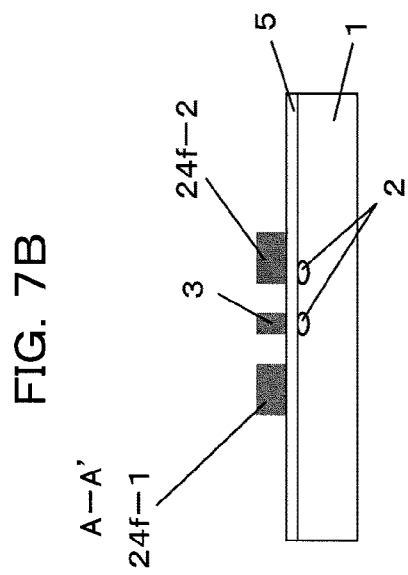
FIG. 7B is a sectional view of the line AA' in FIG. 7A.
Figure 8:
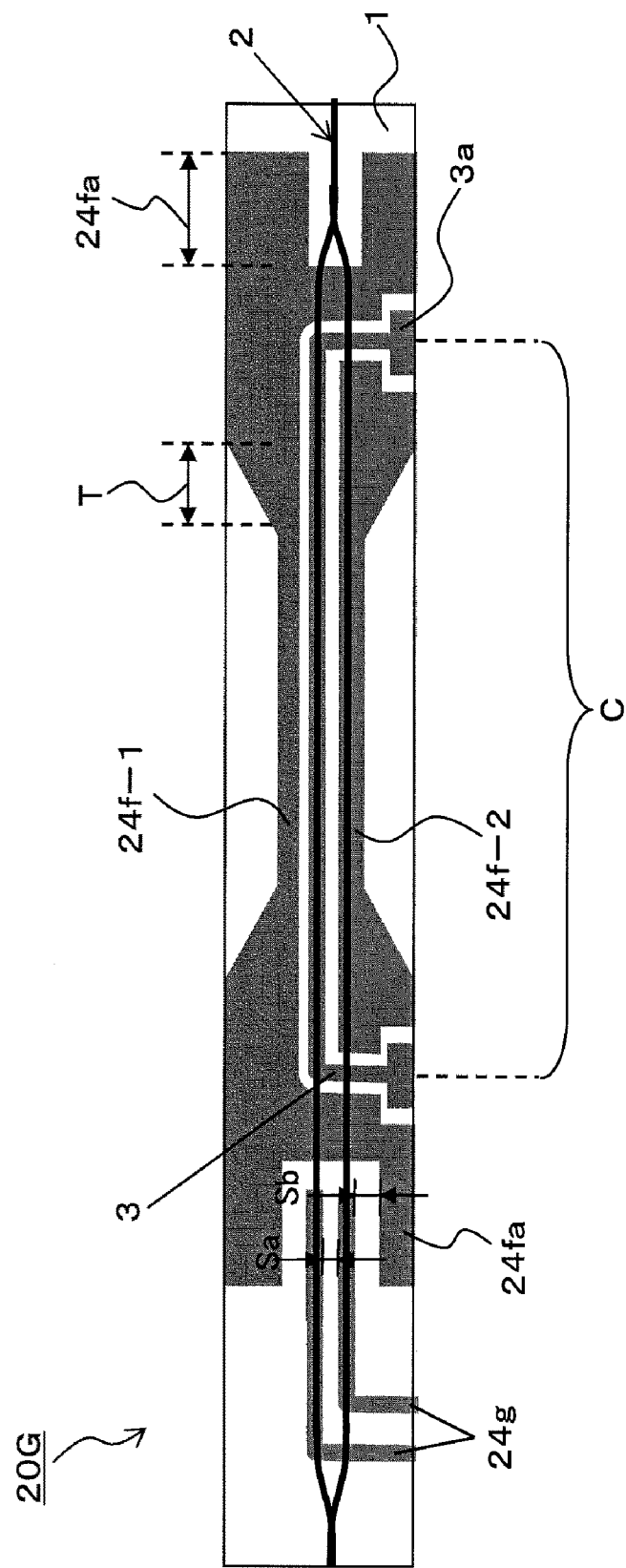
FIG. 8 is a plane view of an optical modulator.

In addition, an optical modulator 20G illustrated in FIG. 8, includes bias electrodes (third electrodes) 24g for applying a bias voltage in addition to the configuration of the optical modulator 20F of FIG. 7. The bias electrodes 24g are each formed over one of the interfering arm waveguides 2b and 2c. For example, a bias voltage to adjust the operating point is applied to the bias electrodes 24g in accordance with the result of monitoring on modulated light output from the optical modulator 20G.

The bias electrodes 24g are each formed to have one end disposed under a portion of the Mach-Zehnder optical interferometer 2 which portion is sandwiched by the extending portions 24fa of the ground electrodes 24f-1 and 24f-2. Besides, the sandwiched portions of the bias electrodes 24g are approximately parallel with the boundary of the extending portions 24fa. This configuration makes the thickness of the electrodes 3, 24f-1, and 24f-2 possible to be uniform without shortening the bias electrodes 24g.

The interval Sb between the electrodes 24g and the boundary of the extending portion 24fa adjacent to each other is set to be larger than the interval Sa between the two bias electrodes 24g over the interfering arm waveguides 2b and 2c. With this configuration, the line of electric force caused by application of voltage at one bias electrode 24g is directed to the other bias electrode 24g rather than to the extending portion 24fa, resulting in preferable electric-field application efficiency.

Figure 9:
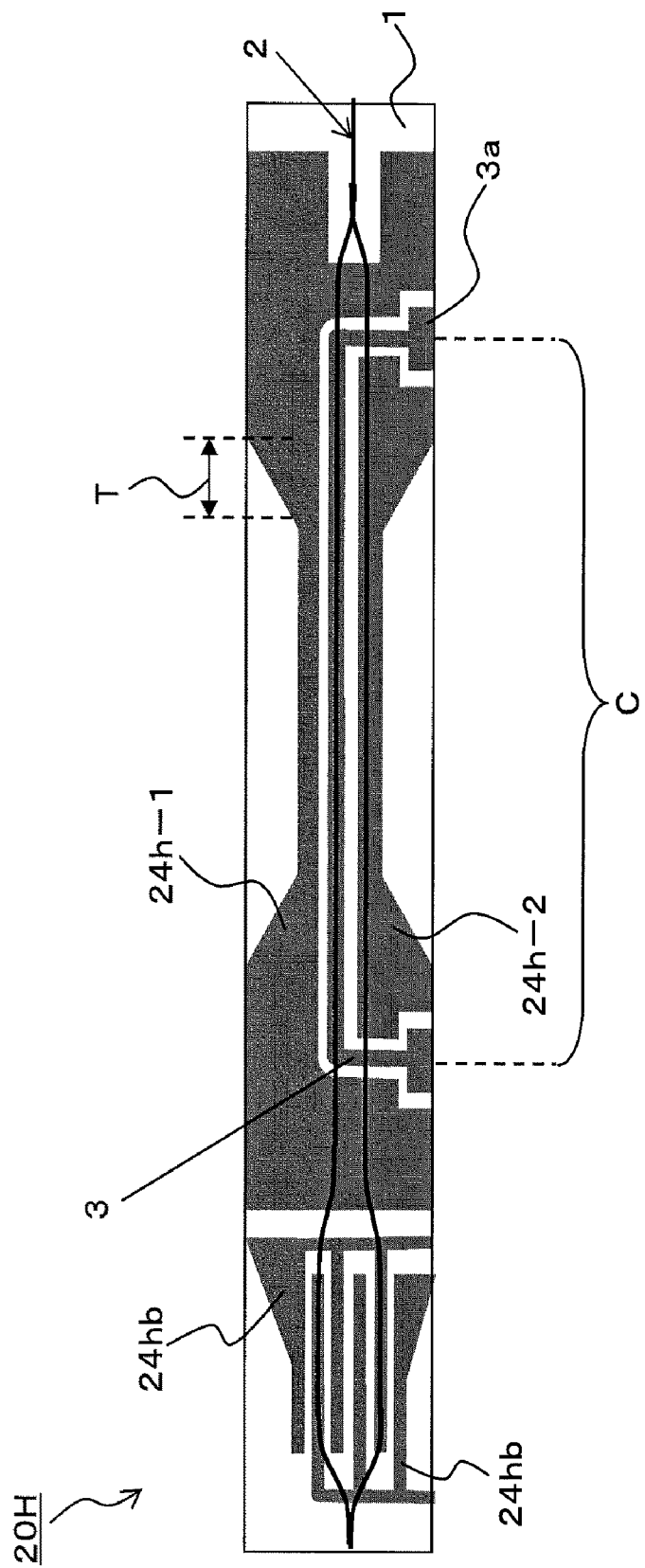
FIG. 9 is a plane view of an optical modulator.

Alternatively, an optical modulator 20H illustrated in FIG. 9 can be employed. Ground electrodes 24h-1 and 24h-2 of the optical modulator 20H omit extending portions outside the interacting portion C (see symbol 24fa in FIG. 7) on one end. The optical modulator 20H includes instead a pair of comb-shape bias electrodes 24hb on the same end outside the interacting portion C.

The optical modulator 20H also disposes the Mach-Zehnder optical interferometer 2 at a position in the vicinity of the center in the width direction of the substrate 1. Similarly to the ground electrodes 24f-1 and 24f-2 of FIG. 7, each of the ground electrodes 24h-1 and 24h-2 interposed by the signal electrode 3 is narrow in the middle portion along the light propagating direction and gradually and linearly becomes wider as approaching both ends thereof. This configuration of the optical modulator 20H ensures the same advantages as those of the optical modulator 20A of FIG. 2A.

Figure 10:
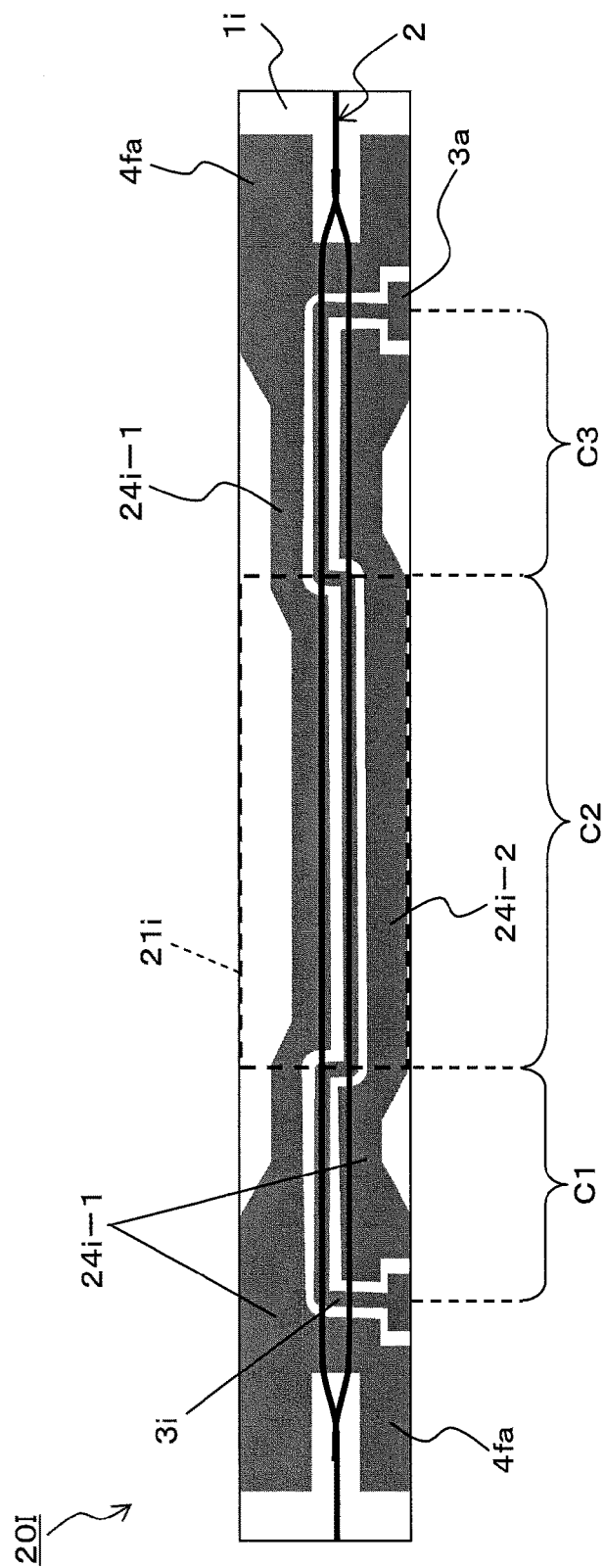
FIG. 10 is a plane view of an optical modulator.

Further alternatively, an optical modulator 20I illustrated in FIG. 10 can be employed. The optical modulator 20I is a zero-chirp modulator using a polarization inversion region 21i. Namely, differently from the foregoing optical modulators 20A through 20H, the optical modulator 20I includes a substrate 1i on which the polarization inversion region 21i is formed.

At the polarization inversion region 21i, an interfering arm waveguide formed under the signal electrode 3i is switched between the interfering arm waveguides 2b and 2c. Specifically, the signal electrode 3i is formed over the interfering arm waveguide 2b at portions other than the polarization inversion region 21i and is formed over the interfering arm waveguide 2 cat the polarization inversion region 21i. The signal electrode 3i bends at the boundaries of the polarization inversion region 21i to be alternatively over the interfering arm waveguide 2b and the other interfering arm waveguide 2c.

Consequently, the optical modulator 20I includes interacting portions C1 through C3 which are discriminated from one another at positions at which a waveguide under the signal electrode 3i switches between the interfering arm waveguides 2b and 2c. The ground electrodes 24i-1 and 24i-2 include conductor subsections corresponding one to each of the interacting portions C1 through C3. Each conductor subsection is narrow in the middle portion along the light propagating direction and gradually becomes wider as approaching both ends of the same subsection.

This configuration makes it possible to prevent the width of the electrode from stepwise varying at the boundary of the polarization inversion region 21i, i.e., at the positions at which a waveguide under the signal electrode switches between the interfering arm waveguides 2b and 2c. Thereby, the electrode thickness can be even. Accordingly, the optical modulator 20I ensures the same advantages as those of the optical modulator 20A of FIG. 2A.

Figures 11A, 11B, 11C, 11D:
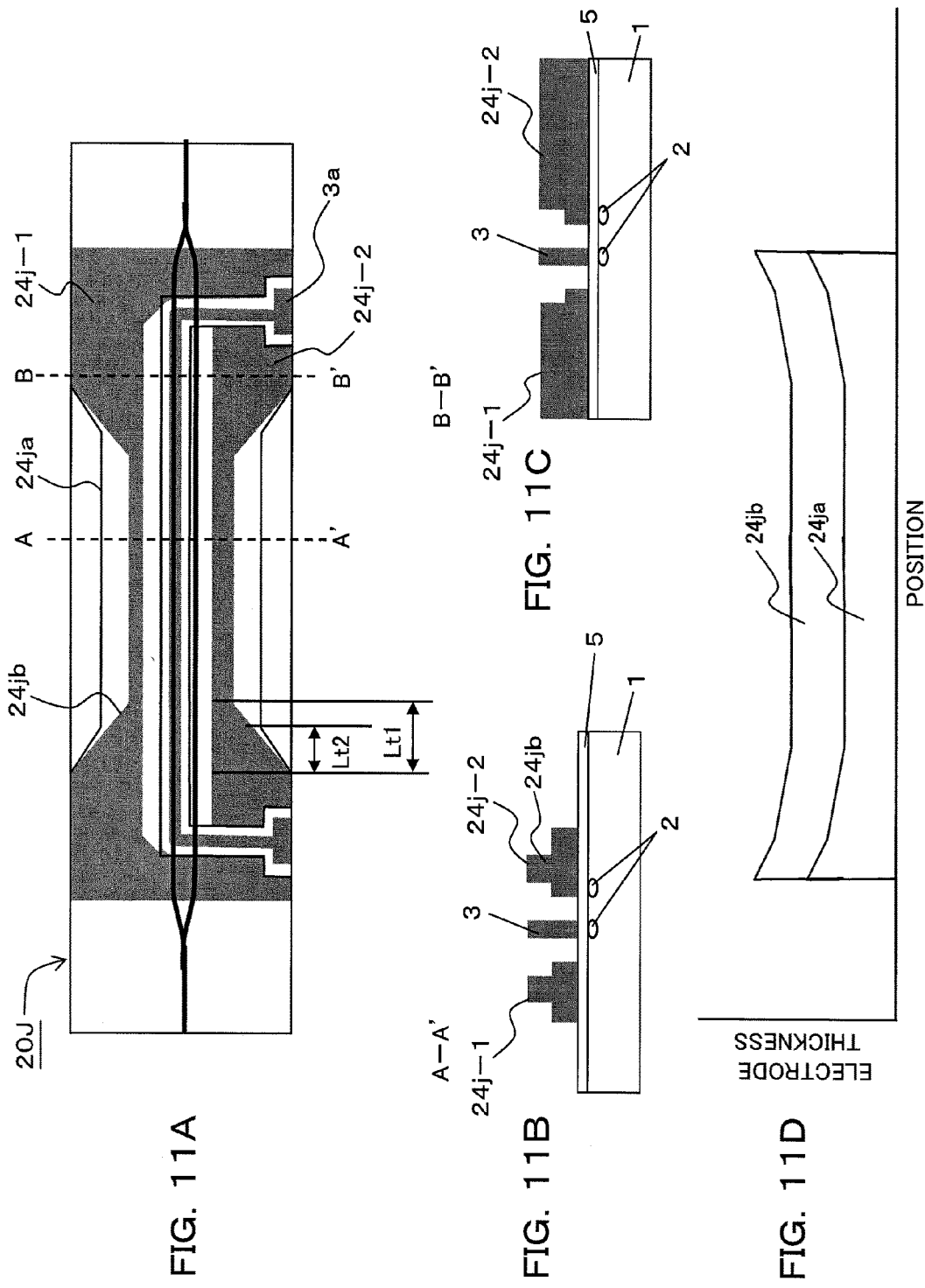
FIG. 11A is a plane view of an optical modulator.
FIG. 11B is a sectional view of the line AA' of FIG. 11A.
FIG. 11C is a sectional view of the line BB' in FIG. 11A.
FIG. 11D is a diagram illustrating a distribution of the thickness of an electrode in the longitudinal direction of the optical modulator.

Further alternatively, an optical modulator 20J illustrated in FIG. 11A can be employed. FIG. 11A is a plane view of the optical modulator 20J; FIG. 11B is an AA' sectional view of FIG. 11A; FIG. 11C is a BB' sectional view of FIG. 11A; and FIG. 11D is a diagram illustrating a distribution of the electrode thickness along the longitudinal directions of the optical modulator 20J. The optical modulator 20J includes ground electrodes 24j-1 and 24j-2 which are formed by depositing a number of layer having different patterns.

For example, the layers of the ground electrodes 24j-1 and 24j-2 are wider as being deposited lower and narrower as being deposited upper, which can slim the upper portion of the optical modulator. As a result, the upper portion can be apart from the signal electrode 3 as compared to the lower portion, enhancing the tolerances of the characteristic impedance and the high-frequency characteristics.

Each layer can have a degree of variation in width in order to restrict variation in thickness in accordance with the electrode at the layer. In other words, the widths of the ground electrodes 24j-1 and 24j-2 can be different from each other at the middle portion in the interacting portion C along the light propagation direction and can have different degrees of gradually becoming wider as approaching both ends of the respective layers.

For example, as illustrated in FIGS. 11A through 11C, the lower electrode layer 24*ja* is wider in the middle portion along the light propagation direction than the upper electrode layer 24*jb*, and has a gentler degree of becoming wider as approaching both ends thereof than the upper electrode layer 24*jb*. Specifically, assuming that the length of tapered portion T of the lower electrode layer 24*ja* to reach the thickness at the pads 3*a* and that of the upper electrode layer 24*jb* are Lt1 and Lt2, respectively, the relationship Lt2<Lt1 is established. Thereby, it is possible restrict the variation in thickness of each of the layers 24*ja* and 24*jb* as illustrated in FIG. 11D. Alternatively, one of the electrode layers may be designed in such a width that the variation in electrode thickness in the remaining layers can be cancelled, of course.

Further alternatively, an optical modulator 20K illustrated in FIG. 12 can be employed. Differently from the foregoing optical modulators 20A through 20J, the opticalmodulator 20K uses an X-cut substrate 1*k*, so that the signal electrode 3*k* is formed along the space between interfering arm waveguides 2*b* and 2*c* of the Mach-Zehnder optical interferometer 2.

Also in this case, the ground electrodes 24*k* includes a conductor section having the following pattern. The conductor section included in the ground electrodes 24*k* is narrow in the middle portion along the light propagating direction in the interacting portion C, in which the electric filed applied by the signal electrode 3*k* interacts with light propagating through the interfering arm waveguides 2*b* and 2*c*, and gradually becomes wider as approaching both ends thereof in the interacting portion C. With this configuration, the optical modulator 20K ensures the same advantages as those of the optical modulator 20A of FIG. 2A. The foregoing embodiments can replace the Z-cut substrate with an X-cut substrate.

Figure 13B:
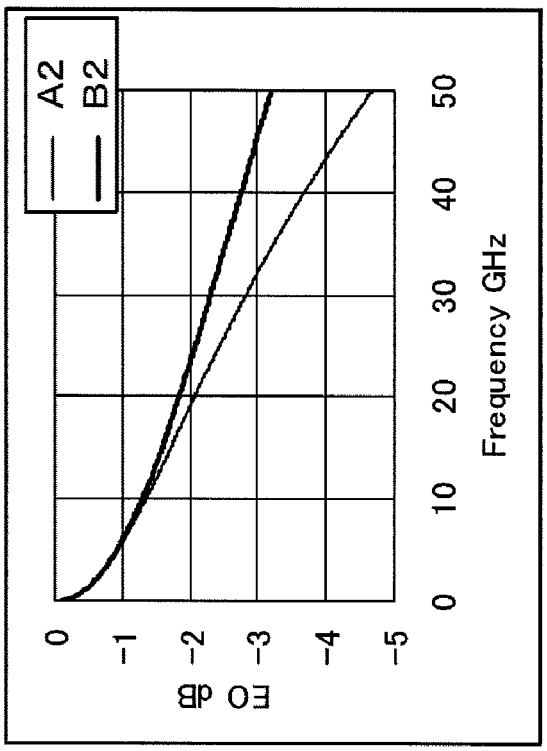
FIGS. 13A and 13B are diagrams respectively comparing physical characteristics of optical modulators.
Figure 13A:
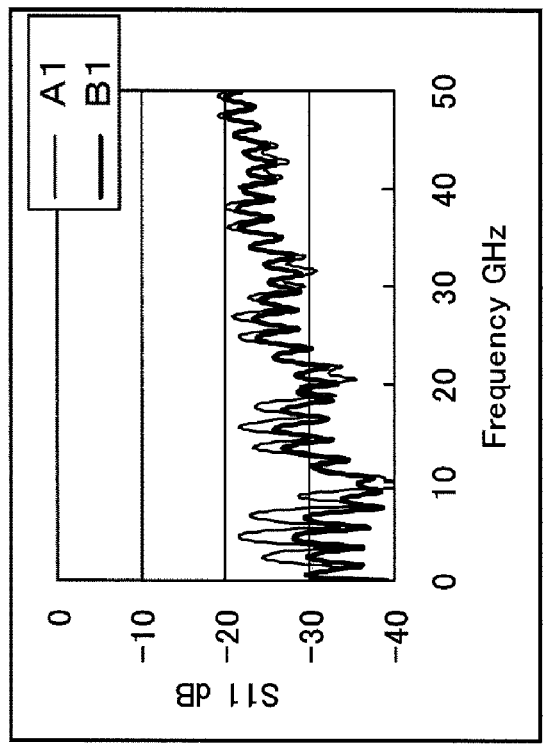

FIGS. 13A and 13B illustrate results of comparison of physical characteristics between the optical modulators 20A through 20K having the configuration to make the electrode thickness even as illustrated in FIGS. 2 through 12 and an optical modulator (e.g., the optical modulator 10 of FIG. 1A) without the configuration to make the electrode thickness even.

FIG. 13A is a diagram illustrating the result of comparison of the reflection characteristics (S11). In the drawing, the thin line A1 represents an example of the reflection characteristics of a microwave of the optical modulator 10 and the bold line B1 represents that of an optical modulator (e.g., the optical modulator 20A) having the configuration of making the electrode thickness even. In the drawing, a smaller amount (dB) of reflected microwave means more preferable modulation characteristics. As illustrated in FIG. 13A, the bold line B1 representing an even electrode thickness has finer characteristics in the range of from the low frequency band to the high frequency band than the thin line A1.

FIG. 13B is a diagram illustrating the result of comparison of the transmission properties (EO). In the drawing, the thin line A2 represents an example of transmission property of the optical modulator 10 and the bold line B2 represents that of an optical modulator (e.g., the optical modulator 20A) having the configuration of making the electrode thickness even. In the drawing, a larger amount (dB) of transmitted light means a larger amount of modulated light output, that is, more preferable property. As illustrated in FIG. 13B, the bold line B2 representing an even electrode thickness has finer characteristics than the thin line A2 particularly at the high frequency band.

Figure 14:
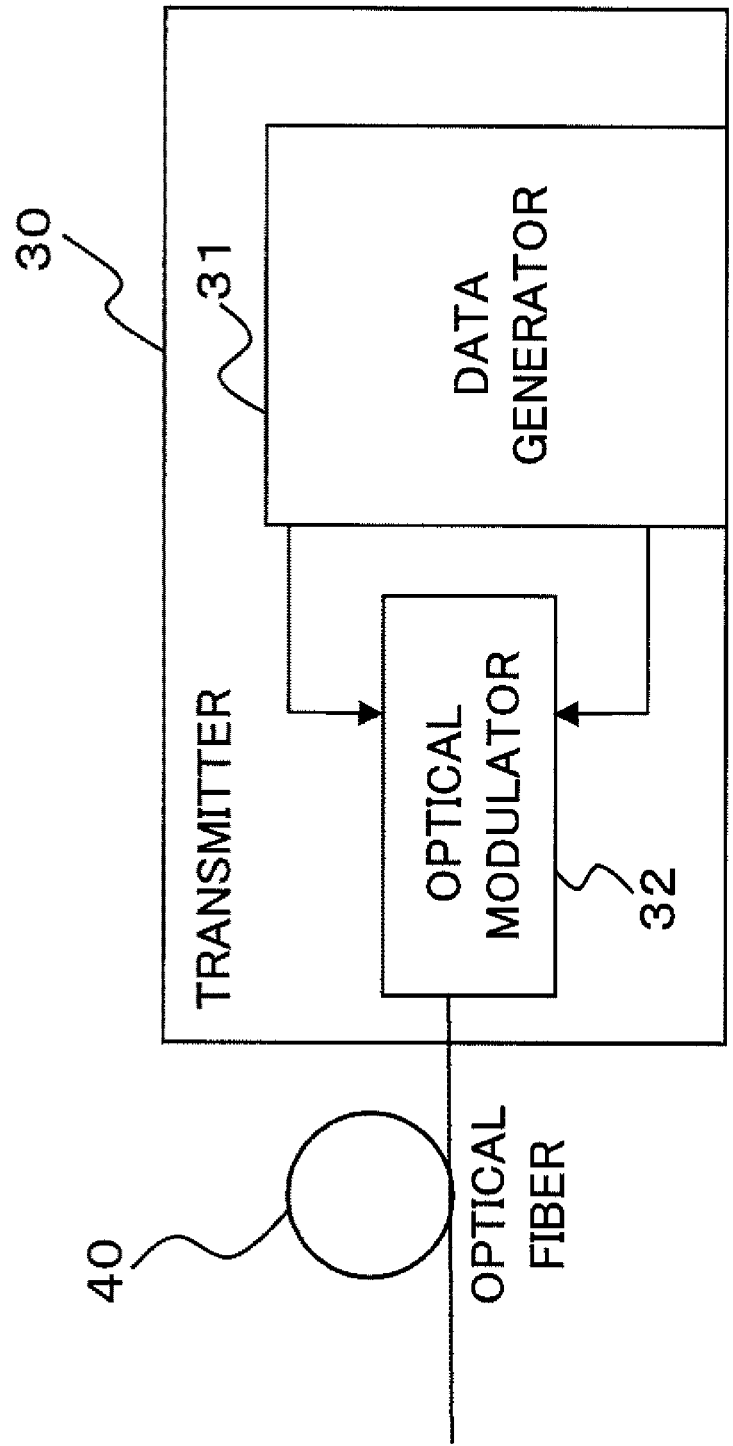
FIG. 14 is a diagram illustrating an optical transmitter.

FIG. 14 is a diagram illustrating a configuration of an optical transmitter 30 to be applied to an optical communication system. The optical transmitter 30 of FIG. 14 includes a data generator 31 that creates data that is to be transmitted and that is in the form of an optical signal, and an optical modulator 32 that carries out optical modulation of data generated by the data generator 31. The optical signal modulated by the optical modulator 32 is transmitted through an optical fiber 40.

The optical modulator 32 can be any of the optical modulators 20A through 20K illustrated in FIGS. 2 through 12. Since these optical modulators 20A through 20K have the configurations of making the electrode thickness at the interacting portion even, fine microwave reflection characteristics and fine transmission property (i.e., modulation band property) can be obtained. Accordingly, the optical transmitter 30 can have improved characteristics, also enhancing the performance thereof.

The foregoing embodiments can be variously modified and varied without departing from the sprit of the present invention. For example, the optical modulators illustrated in FIGS. 2-5, and 7-12 may have conductor sections gradually and curvedly, not linearly, varying as approaching both ends.

The technique disclosed herein can be applied not only to inhibiting the variation of the electrode thickness distribution but also to intentionally variation in electrode thickness to improve the characteristics. For example, if the input wiring and the terminal have different characteristic impedances, the tapered portion at the input of the electrode can have a different minimum width and/or a different length from those of the tapered portion at the output of the electrode.

Thereby, the electrode thickness at the input and that at the output can be adjusted independently each other to match the impedances both at input and output, improving the characteristics of the optical modulator. Further, in the cases where the interacting portion has an impedance smaller than 50Ω, the impedance at the pads 3*a* can be adjusted to 50Ω by making the difference in the width between the start and the end of the ground electrodes steplessly varying large or by forming the electrode thicknesses at the pads 3*a* to be thinner than that at the interacting portion.

The foregoing embodiments can improve the characteristics of an optical modulator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. An optical modulator comprising:
   a substrate which has electro-optic effect;
   a Mach-Zehnder optical interferometer which is formed in the substrate and which includes a first waveguide and a second waveguide;
   a signal electrode which applies an electrical field to the Mach-Zehnder optical interferometer through being supplied with an electric signal corresponding to a signal for optical modulation;
   a ground electrode formed apart from the signal electrode; and a conductor section which is narrow in a middle thereof along the light propagating direction and which gradually becomes wider as approaching both ends thereof along the light propagating direction in an interacting portion at which the electric field applied by the signal electrode interacts with light propagating through the first waveguide and the second waveguide.

2. The optical modulator according to claim 1, wherein the conductor section includes a portion that linearly and gradually becomes wider as approaching the both ends along the light propagating direction in the interacting portion.

3. The optical modulator according to claim 1, wherein the conductor section includes a portion that curvedly and gradually becomes wider as approaching the both ends along the light propagating direction in the interacting portion.

4. The optical modulator according to claim 1, wherein the signal electrode is substantially symmetric with respect to a center axis of the substrate.

5. The optical modulator according to claim 1, wherein the substrate is a Z-cut substrate.

6. The optical modulator according to claim 1, wherein:
the signal electrode is formed above the first waveguide and the second waveguide;
the signal electrode bends one or more times to be alternately over the first waveguide and the second waveguide;
the interacting portion is divided into a plurality of interacting subsections at points at which a waveguide under the signal electrode switches between the first waveguide and the second waveguide;
the conductor section includes a plurality of conductor subsections corresponding one to each of the plurality of interacting subsections; and
each of the plurality of conductor subsections is narrow in a middle thereof along the light propagating direction and which gradually becomes wider as approaching both ends thereof along the light propagating direction in an interacting portion.

7. The optical modulator according to claim 1, wherein the substrate is an X-cut substrate.

8. The optical modulator according to claim 1, wherein the conductor section is a part or the entire part of the ground electrode.

9. The optical modulator according to claim 1, wherein the conductor section is a floating electrode.

10. The optical modulator according to claim 1, wherein:
the ground electrode has a hollow which is wide in a middle of the hollow along the light propagating direction and which gradually becomes narrower as approaching both ends of the hollow along the light propagating direction, so that the ground electrode includes a first portion and a second position between which the hollow is interposed;
the first portion, disposed between the signal electrode and the hollow, has a uniform width along the light propagating direction; and
the second portion, disposed on the opposite side of the hollow to the first portion, gradually becomes wider as approaching both ends of the second portion.

11. The optical modulator according to claim 1, wherein the ground electrode extends outside the interacting portion in the light propagating section except for portions at which the Mach-Zehnder optical interferometer is formed.

12. The optical modulator according to claim 11, further comprising a third electrode substantially parallel to a portion of the ground electrode, the portion extending outside the interacting portion.

13. The optical modulator according to claim 1, wherein:
the ground electrode includes a plurality of layers sequentially deposited,
each of the plurality of layers is narrow in a middle thereof and gradually becomes wider as approaching both ends thereof along the light propagating direction in the interacting portion; and
the plurality of layers have different width in the middles thereof and have different degrees of gradually becoming wider as approaching the both ends thereof.

14. An optical transmitter comprising an optical modulator comprising:
a substrate which has electro-optic effect;
a Mach-Zehnder optical interferometer which is formed in the substrate and which includes a first waveguide and a second waveguide;
a signal electrode which applies an electrical field to the Mach-Zehnder optical interferometer through being supplied with an electric signal corresponding to a signal for optical modulation;
a ground electrode formed apart from the signal electrode; and
a conductor section which is narrow in a middle thereof along the light propagating direction and which gradually becomes wider as approaching both ends thereof along the light propagating direction in an interacting portion at which the electric field applied by the signal electrode interacts with light propagating through the first waveguide and the second waveguide.

* * * * *

UNITED STATES PATENT AND TRADEMARK OFFICE
CERTIFICATE OF CORRECTION

PATENT NO. : 8,406,576 B2
APPLICATION NO. : 12/862864
DATED : March 26, 2013
INVENTOR(S) : Masaki Sugiyama It is certified that error appears in the above-identified patent and that said Letters Patent is hereby corrected as shown below:

In the Claims:

Column 12, Line 3, In Claim 10, delete "position" and insert --portion--, therefor.

Signed and Sealed this
Second Day of July, 2013

Teresa Stanek Rea
*Acting Director of the United States Patent and Trademark Office*